United States Patent
Gannholm et al.

(10) Patent No.: US 8,923,198 B2
(45) Date of Patent: Dec. 30, 2014

(54) USER TERMINAL FOR MIMO

(75) Inventors: Magnus Gannholm, Molnlycke (SE); Magnus Johansson, Goteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 185 days.

(21) Appl. No.: 13/512,468

(22) PCT Filed: Nov. 30, 2009

(86) PCT No.: PCT/EP2009/066041
§ 371 (c)(1),
(2), (4) Date: May 29, 2012

(87) PCT Pub. No.: WO2011/063852
PCT Pub. Date: Jun. 3, 2011

(65) Prior Publication Data
US 2012/0236725 A1    Sep. 20, 2012

(51) Int. Cl.
  *H04W 4/00*    (2009.01)
  *H04B 7/04*    (2006.01)
  *H04W 36/30*   (2009.01)

(52) U.S. Cl.
  CPC ........... *H04B 7/0417* (2013.01); *H04W 36/30* (2013.01)
  USPC ........................................ 370/328

(58) Field of Classification Search
  None
  See application file for complete search history.

(56) References Cited

U.S. PATENT DOCUMENTS

| | | | |
|---|---|---|---|
| 2008/0013610 A1* | 1/2008 | Varadarajan et al. | 375/221 |
| 2008/0031277 A1* | 2/2008 | Walter et al. | 370/469 |
| 2008/0063115 A1* | 3/2008 | Varadarajan et al. | 375/299 |
| 2008/0268785 A1 | 10/2008 | McCoy et al. | |
| 2008/0316950 A1* | 12/2008 | Damnjanovic | 370/311 |
| 2009/0017769 A1* | 1/2009 | Chen et al. | 455/69 |
| 2009/0161545 A1* | 6/2009 | Ho et al. | 370/235 |
| 2010/0178919 A1* | 7/2010 | Deepak et al. | 455/435.2 |
| 2010/0202400 A1* | 8/2010 | Richardson et al. | 370/330 |
| 2011/0002406 A1* | 1/2011 | Ming et al. | 375/260 |
| 2011/0317577 A1* | 12/2011 | Yamada et al. | 370/252 |

OTHER PUBLICATIONS

English translation of Office Action issued in Chinese Patent Application No. 200980162658.X on Feb. 26, 2014, 18 pages.

* cited by examiner

*Primary Examiner* — Anh-Vu Ly
*Assistant Examiner* — Gustavo Lopez-Vargas
(74) *Attorney, Agent, or Firm* — Rothwell, Figg, Ernst & Manbeck P.C.

(57) ABSTRACT

A user terminal (115, 200) for a wireless communications system, equipped with at least two antennas (205, 206, 207) for the reception and/or transmission of traffic from a higher node (105). The user terminal (115, 200) is arranged to receive (210) said traffic in one or more data streams ($S_1$, $S_2$) i.e. with a rank of one or higher. The user terminal is arranged (215, 216, 220) to choose with which rank the higher node (105) should transmit the traffic to the user terminal (115, 200) on, and to also signal this choice to the higher node (105). The user terminal (115, 200) is arranged to base its choice of rank on the estimated received data rate at the user terminal for different transmission ranks, the estimated power consumption in the user terminal for different transmission ranks and the Signal to Noise ratio, SIR, of the channel at the UE.

12 Claims, 3 Drawing Sheets

USER TERMINAL FOR MIMO

CROSS REFERENCE TO RELATED APPLICATION(S):

This application is a 35 U.S.C. §371 National Phase Entry Application from PCT/EP2009/066041, filed Nov. 30, 2009, designating the United States, the disclosure of which is incorporated by reference herein in its entirety.

TECHNICAL FIELD

The present invention discloses a user terminal for MIMO.

BACKGROUND

In systems according to the mobile cellular standard known as 3G Long Term Evolution or 3G LTE for short, so called Multiple Input Multiple Output, MIMO, transmission techniques like transmit diversity, multi-stream and beam forming are expected to be an integral part of the systems. These MIMO techniques exploit multiple transmit antennas at the eNodeB, the evolved NodeB, sometimes also referred to as "the radio base station". It is also expected that a large percentage of the user terminals, also called UEs, "user equipment", will be equipped with multiple antennas in order to enable them to utilize MIMO transmission techniques, both in the downlink and the uplink directions.

A further definition of MIMO is as follows: a channel with multiple antennas on the transmit side as well as on the receive side is referred to as MIMO, Multiple Input Multiple Output. A MIMO channel can be defined as $N_{TX} \times N_{RX}$, where $N_{TX}$ is the number of transmitter antennas and $N_{RX}$ is the number of receiver antennas.

The term "rank" is often used in connection with MIMO techniques, and can be defined as follows: a rank of 1 means that only one data stream is transmitted, and a rank of n means that n data streams are transmitted simultaneously. A rank of 1 corresponds either to transmission from a single antenna or more traditional beam forming from multiple antennas, in which case the phase of the signals transmitted from the transmit antennas is adapted so that the signals add up coherently at the receiver. Phase adaptation typically requires feedback from the receiver regarding the rank with which it is possible and/or desirable to transmit, and usually requires updates on a rather short time scale, e.g. in the order of a few milliseconds. This can also be seen as a general observation on MIMO systems: in a MIMO system, the rank, i.e. the number of streams that can be supported varies with the radio channel, and needs to be fed back from the receiver to the transmitter. This adaptation of the number of streams is also called rank adaptation, and, as pointed out above, needs to be done on the time scale mentioned above, i.e. in the order of a few milliseconds.

SUMMARY

It is a purpose of the present invention to improve on the speed and quality with which the feedback for rank adaptation is given from a user terminal to a higher node in a wireless communication system which supports multi rank transmission modes such as e.g. MIMO, in which systems the rank can be changed dynamically per user.

This purpose is addressed by the present invention in that it discloses a user terminal for a wireless communications system which is equipped with at least two antennas for the reception and/or transmission of traffic from a higher node in the system. The user terminal of the invention is arranged to receive said traffic in one or more data streams, i.e. with a rank of one or higher, and according to the invention, the user terminal is arranged to choose which rank the higher node should transmit the traffic to the user terminal with and to also signal this choice to the higher node in the system.

The user terminal is arranged to base its choice of rank on the following:

The estimated received data rate at the user terminal for different transmission ranks, The estimated power consumption in the user terminal for different transmission ranks.

Channel quality: to choose a higher rank, the Signal to Noise ratio, SIR, of the channel must be over a threshold.

In one embodiment, the user terminal of the invention is arranged to choose a higher rank than the present one if the estimated received data rate at the user terminal for a higher rank than the present rank is higher than a first threshold, the ratio between the estimated power consumption in user terminal for the present transmission rank and the total power used by the channel in the cell of the user terminal is below a second threshold, and the SIR of the channel used is above a third threshold.

The exact values of the thresholds mentioned here are of course design parameters which can and may vary, for example due to the demands of different system operators. However, suitable examples of parameters are as follows:

The first threshold, i.e. the estimated received data rate for a higher rank, should be in the area of a 70% increase.

The second threshold, i.e. the ratio between the estimated power consumption in user terminal for the present transmission rank and the total power used by the channel in the cell of the user terminal should be 30% or less.

The third threshold, i.e. the SIR of the channel used, should be above 3 dB in order to choose a higher rank.

In one embodiment, the user terminal of the invention is arranged to estimate the received data rate for different transmission ranks by means of monitoring the utilization/congestion of a downlink channel, and to use a degree of utilization above a certain threshold as an indication to choose a higher rank.

In one embodiment, the user terminal of the invention is arranged to monitor the utilization/congestion of a downlink channel by means of measuring the received power in resource blocks which are not destined for it, i.e. for the user terminal.

In one embodiment, the user terminal of the invention is a UE for a 3G Long Term Evolution, a 3G LTE, MIMO system.

In one embodiment of the user terminal of the invention, the predefined channel being the LTE PDSCH channel, the Physical Downlink Shared Channel.

By means of the invention, a user terminal in a system such as, e.g. the 3G LTE system, will be able to base its requests for switching between different ranks on better criteria than previously, and will also be able to do so in a quicker manner.

BRIEF DESCRIPTION OF THE DRAWINGS

The invention will be described in more detail in the following, with reference to the appended drawings, in which.

DETAILED DESCRIPTION

The invention will be described in the following using terminology of the 3G LTE system, Long Term Evolution. It should however be pointed out that this is in order to facilitate the reader's understanding of the invention, and should not be used to restrict the scope of protection sought for nor granted to the present invention which can be applied to a variety of cellular systems.

Figure 1:
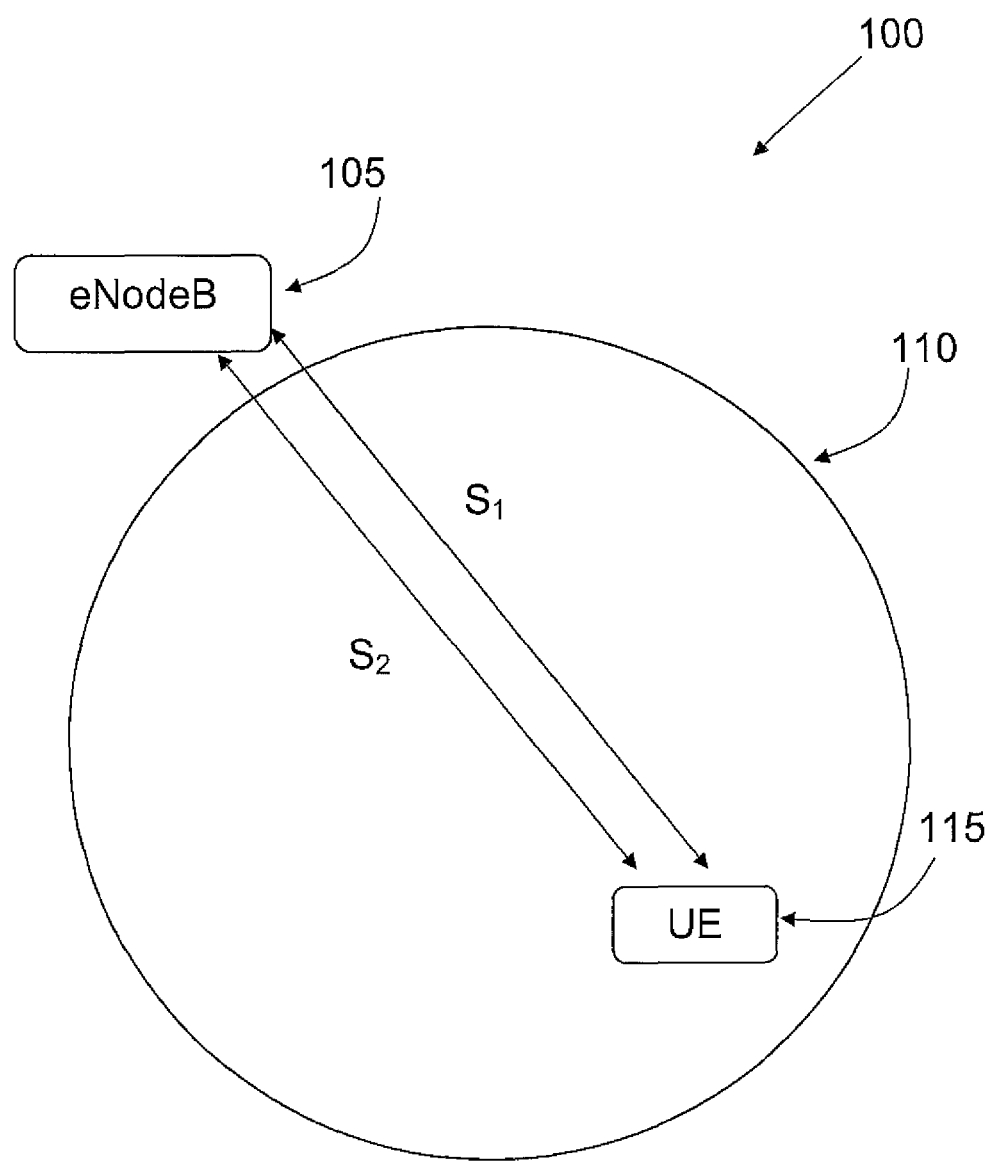
FIG. 1 shows an overview of a system in which the invention is applied.

FIG. 1 shows a schematic overview of a system 100 in which the present invention is applied. The system 100 is a so called LTE system, but the invention can be applied in any system which supports MIMO or other multi-antenna transmission modes in which the transmission rank can be changed per user.

As indicated in FIG. 1, the system 100 comprises a number of cells, one of which is shown as an example, numbered as 110. Each cell can accommodate a number of user terminals, referred to in LTE as UEs, User Equipment, and FIG. 1 shows one UE 115 as an example. For each cell 110 in the system 100, there is at least one higher node 105, through which all traffic to and from the UE 115 is routed. In LTE, the higher node 105 is known as the eNodeB, evolved NodeB.

The system 100 is a system which allows for multi antenna transmission modes between the eNodeB 105 and the UE 115, as indicated by means of the two data streams $S_1$ and $S_2$ shown in FIG. 1.

The maximum number of data streams can vary between different systems and also between different users, so the number two, which is used in FIG. 1, should be seen as an example only.

The eNodeB 105 can switch between different ranks in the downlink traffic, i.e. the transmission to the UE 115, and preferably carries out this switching based on information received from the UE 115. According to the invention, the UE 115 is thus arranged to choose the rank of the transmissions which are directed towards it from the eNodeB 105, and also to signal this choice to the eNodeB 105, so that the eNodeB 105 may carry out this choice, which can also be seen as an instruction from the UE 115 to the eNodeB 105.

In LTE, data transmissions from an eNodeB to the UEs are transmitted on the so called PDSCH, Physical Downlink Shared Channel. Thus, the choice of rank for downlink traffic from the eNodeB 105 to the UE 115 is concentrated to the PDSCH, although the principles of the invention are of course applicable to other channels as well.

According to the invention, the UE 115 makes its choice of DL (downlink) rank to the eNodeB based on the following criteria:

The estimated received data rate at the UE 115 for different transmission ranks, The estimated power consumption in the UE 115 for different transmission ranks, The UE's SIR, Signal to Interference Ratio.

Figure 2:
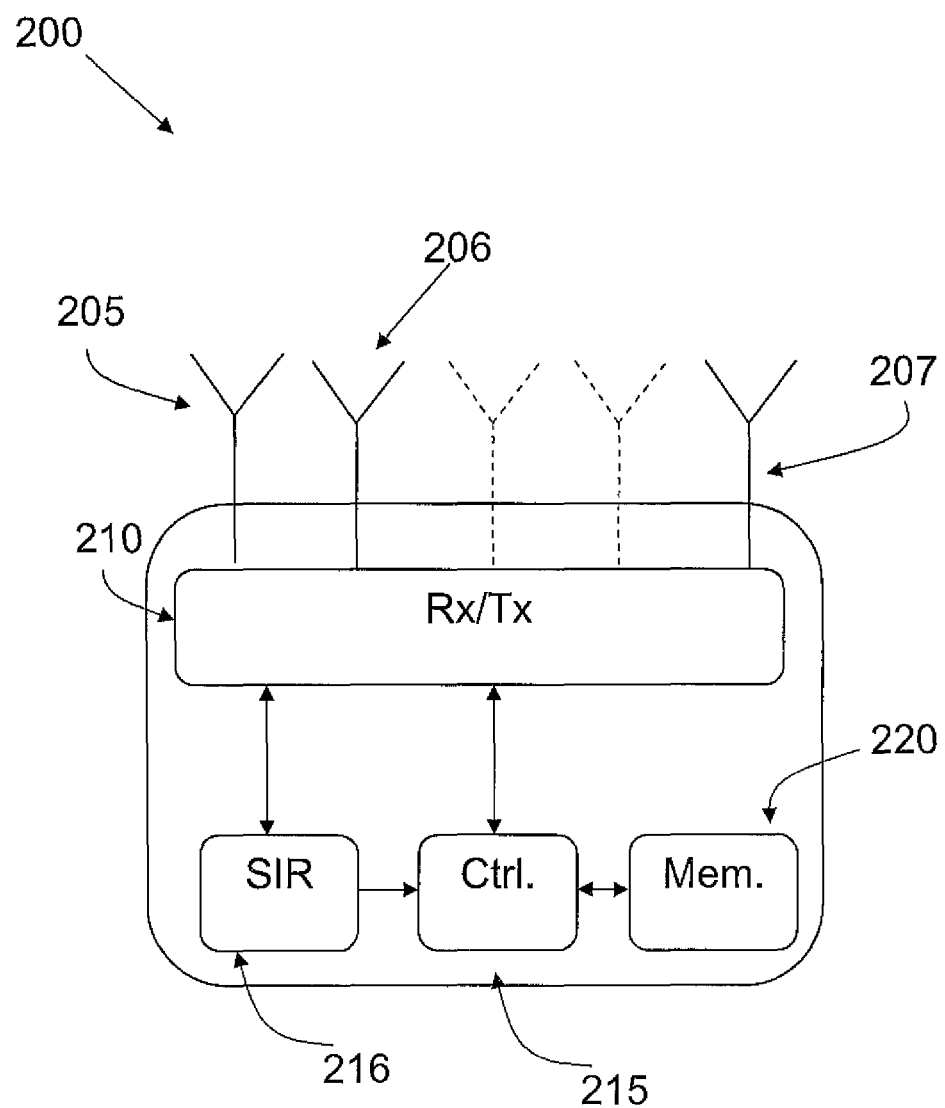
FIG. 2 shows a schematic block diagram of a user terminal of the invention.

Before these criteria are elaborated upon further, a UE 200 of the invention will be described briefly with reference to FIG. 2. As shown in FIG. 2, the inventive UE 200 comprises a number of antennas, with three antennas 205, 206, 207 being by way of example, with an additional number of antennas indicated in dashed lines, in order to highlight the fact that the number of antennas with which the inventive UE is equipped is variable within the scope of the invention.

Apart from the antennas 205, 206, 207, the UE 200 is also equipped with a receive transmit unit 210, which is connected to the antennas, and also comprises a control unit 215, such as, for example, a microprocessor, and is also equipped with a memory unit 220, suitably connected to the control unit 215. The control unit 215 controls the function of the UE 215, and takes the decision of which rank to choose and to then "recommend" to the eNodeB for the DL transmissions. The recommendations are transmitted to the eNodeB via one or more of the antennas 205, 206, 207 by means of the receive/transmit unit 210, controlled from the control unit 215. As shown, the UE 200 also comprises a module 216 for estimating the SIR, i.e. the Signal to Interference Ratio in the UE of the channel in question, in this case the LTE PDSCH.

Turning now to a more exact description of how the UE of the invention "chooses" the DL rank by utilizing the three criteria outlined previously, i.e. the estimated received data rate at the UE 115 for different transmission ranks, the estimated power consumption in the eNodeB 105 for different transmission ranks and the SIR at the UE, the following can be said:

A principle according to the invention is that the UE chooses, and requests, a higher rank from the eNodeB depending on the relationship between the estimated received data rate at the UE for different ranks and the increased power consumption at the eNodeB for different ranks, a notion which will be explained in detail below; in addition, the SIR at the UE is also considered.

Another principle which is utilized by a UE of the invention is that if the UE detects little or no congestion on the PDSCH, and more REs (in LTE) can be used by the eNodeB for the UE, then the UE will choose to maintain the present rank, since it in such a case is more power efficient to maintain the present rank and instead increase the number of REs to the UE.

A more detailed explanation of the function of the UE of the present invention is as follows, with renewed reference to FIG. 2 and the reference numbers of that drawing:

The control unit 215 of the UE 200 will choose a higher rank and send a corresponding request to the eNodeB under the following conditions:

1. If the estimated data rate for a higher rank than the present rank is higher than for the present rank, AND
2. If the estimated increase of power consumed by the UE for a higher rank is acceptable,
3. If the SIR for the channel used is above a certain threshold.

If any of the conditions given above are not fulfilled, the control unit 215 of the UE 200 chooses the present DL rank, i.e. the DL rank remains unchanged.

The data rate per rank, e.g. a possibly higher rank than the present one, will be estimated by the control unit 215 in the following manner:

The UE 200 monitors the utilization/congestion of the physical downlink shared channel, i.e. the PDSCH, by checking the degree of utilization of the PDSCH, in which case the UE 200 can determine that the UE is not likely to receive more data regardless of the DL rank. This is an indication to keep the rank at the present level. The degree of utilization of the PDSCH is measured in the following manner according to the invention:

The UE is arranged to measure the received power in resource blocks which are not destined for it, i.e. for the UE. If the UE detects that more than a certain amount of such resource elements are empty, the UE can determine that it has probably received all the data in the eNodeBs buffer for the UE. (It should however be noted that an exception to this is the case with sub frames in which the UE receives a HARQ retransmission in each codeword, since more data could not have been sent to the UE anyway in that case.)

If the resource utilization in the cell of the UE is above a certain threshold, T1, the UE is arranged to choose a higher rank, and to transmit a corresponding m request to the eNodeB. The resource utilization is here defined as the percentage of REs which are not defined for the UE and which are empty, i.e. which have a power level lower than a certain limit.

If, on the other hand, the resource utilization is equal to or below the threshold T1, the UE will choose the present rank, and in this case does not need to notify the eNodeB.

In some embodiments, time filtering or "hysteresis" in the choice of rank can be introduced in order to avoid over-frequent changes of DL rank.

The second criteria for requesting a higher DL rank from the eNodeB is, as mentioned above, the estimated power usage in the UE for a higher DL rank.

The UE's power usage for a higher DL rank is, according to the invention, estimated by the UE by estimating the power usage of the UE for the present rank divided by the total power used by the channel in the cell of the UE, which leads to a coefficient η which will be explained in the following:

1) The UE's power usage for the present rank is estimated as follows:

$P_{UE} = P_{RSRP1}/P_{\Delta 1} * N_{RBTOT1}$, where:

$P_{RSRP1}$ is the UE's average received power of the received reference symbols destined for the UE, $P_{\Delta 1}$ is the power difference between the reference symbols and the resource blocks used by the UE's data transmissions, $N_{RBTOT1}$ is the number of resource blocks destined for the UE, 2) The total power used by the channel in the cell of the UE, is estimated by the UE as follows:

$P_{TOT} = P_{RSRP2}/P_{\Delta 2} * N_{RBTOT2}$, where:

$P_{RSRP2}$ is the power of the transmitted reference symbols in the cell.

$P_{\Delta 2}$ is the power difference between the transmitted reference symbols and that of the resource blocks used in the cell of the UE, $N_{RBTOT2}$ is the number of resource blocks used in the cell of the UE.

When the UE has determined $P_{UE}$ and $P_{TOT}$ as described above, a coefficient η is determined and evaluated by the UE to see if the power used by the UE in a higher rank. The coefficient n is determined by the UE by dividing $P_{UE}$ by $P_{TOT}$, i.e. in the following manner:

$\eta = P_{UE}/P_{TOT}$

The coefficient η is then compared by a threshold by the UE to see if the present DL rank is sufficient, or if a higher DL rank would be beneficial. If η is not 1 and not close to 1, then the present rank is deemed to be sufficient. In other words, in "pseudo-code":
IF η>T, then maintain DL rank,
ELSE request higher DL rank
where T is a threshold which is a design parameter, but which is set to be close to 1, for example in the range of 1-1.3.

The SIR at the UE can be determined in a number of ways, but in one embodiment the SIR module 216 of the UE 200 compares the signal strength in the reference symbols transmitted by the eNodeB with the noise level in the receiver of the UE 200. This ratio, i.e. the signal strength compared to the noise level is then suitably expressed in dB, and compared with a threshold value, which can, for example, be stored in the memory unit 220 of the UE 200. The determining of the SIR is suitably controlled by the control unit 215, of which the SIR unit 216 can in fact be part of, or the SIR unit can, as shown in FIG. 2, be a separate unit within the UE 200.

Figure 3:
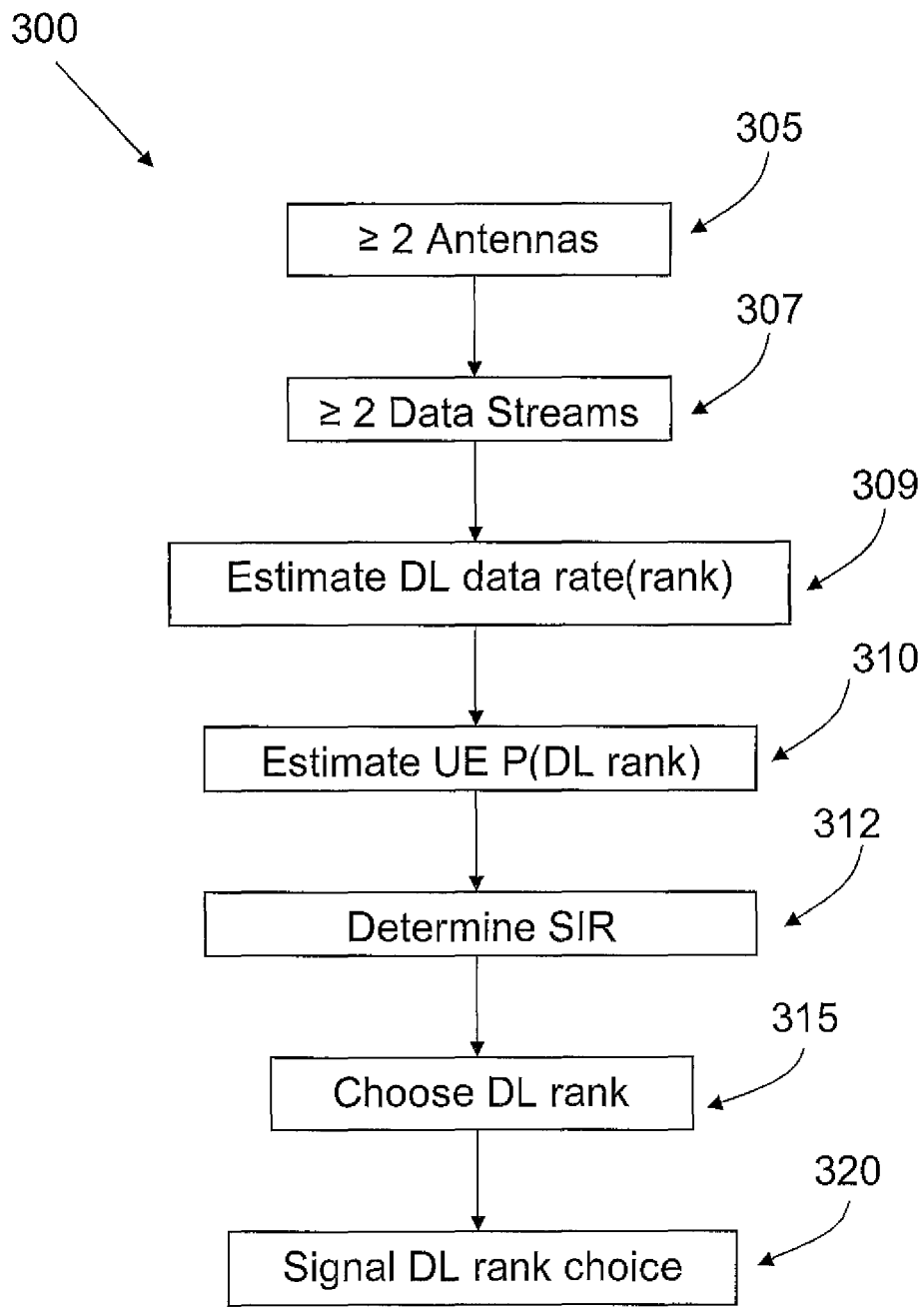
FIG. 3 shows a flow chart of a method used in a user terminal of the invention.

FIG. 3 shows a flow chart 300 of a method of the invention. It should be pointed out that the order in which the steps of the method are carried out is not necessarily that indicated in FIG. 3, which is merely one example of the order in which the steps can be carried out.

As has also emerge from the description above, the method 300 is intended for a user terminal for a wireless communications system, and comprises, as indicated in box 305, using at least two antennas for the reception and/or transmission of traffic in the user terminal from a higher node in the system.

As shown in box 307, the method 300 also comprises receiving said traffic in one or more data streams, i.e. with a rank of one or higher on a predefined channel. As shown in box 315, the method 300 comprises choosing with which rank the higher node should transmit the traffic to the user terminal on the predefined channel, and to also signal, as shown in box 320, this choice to the higher node in the system.

According to the method 300, the choice of rank is based on the following:
The estimated received data rate, box 309, at the user terminal for different transmission ranks,
The estimated power consumption, box 310, in the user terminal for different transmission ranks,
the Signal to Noise ratio, SIR, box 312, of the channel at the user terminal.

In one embodiment of the method 300, a choice of higher rank than the present one on said predefined channel is made if the estimated received data rate at the user terminal for a higher rank than the present rank is higher than a first threshold, and the ratio between the estimated power consumption in the user terminal for the present transmission rank and the total power used by the channel in the cell of the user terminal is below a second threshold, and the SIR of the channel used is above a third threshold.

In one embodiment of the method 300, the received data rate for different transmission ranks is estimated by means of monitoring the utilization/congestion of a downlink channel, and a degree of utilization above a certain threshold is used as an indication to choose a higher rank. In one such embodiment, the utilization/congestion of a downlink channel is monitored by means of measuring the received power in resource blocks which are not destined for it, i.e. for the user terminal.

In one embodiment, the method 300 is applied in a UE for a 3G Long Term Evolution, a 3G LTE, MIMO system. In one such embodiment, said predefined channel is the LTE PDSCH channel, the Physical Downlink Shared Channel.

The invention is not limited to the examples of embodiments described above and shown in the drawings, but may be freely varied within the scope of the appended claims.

The invention claimed is:

1. A user terminal for a wireless communications system, the user terminal comprising:
    at least two antennas for the reception and/or transmission of traffic from a higher node in the system, the user terminal being arranged to receive said traffic in one or more data streams with a rank of one or higher, on a predefined channel;
    a control unit arranged to choose with which rank the higher node should transmit the traffic to the user terminal on said predefined channel, and to also signal this choice to the higher node in the system, the control unit of the user terminal being arranged to base its choice of rank on the following:
    the estimated received data rate at the user terminal for different transmission ranks, wherein the user terminal is arranged to estimate the received data for different transmission ranks by monitoring the utilization/congestion of a downlink channel, and to use a degree of utilization above a certain threshold as an indication to choose a higher rank, the estimated power consumption in the user terminal for different transmission ranks, and the Signal to Noise ratio, (SNR) of the channel at the user terminal.

2. The user terminal of claim 1, wherein the user terminal is arranged to choose a higher rank than a present rank if the estimated received data rate at the user terminal for the higher rank is higher than a first threshold, the ratio between the estimated power consumption in the user terminal for the present transmission rank and the total power used by the channel in the cell of the user terminal is below a second threshold, and the (SNR) of the channel used is above a third threshold.

3. The user terminal of claim 1, wherein the user terminal is arranged to monitor the utilization/congestion of a downlink channel by measuring the received power in resource blocks which are not destined for the user terminal.

4. The user terminal of claim 1, wherein the user terminal is a UE for a 3GLong Term Evolution (a 3G LTE) MIMO system.

5. The user terminal of claim 4, wherein said predefined channel is a Physical Downlink Shared Channel.

6. A method for a user terminal for a wireless communications system, the method comprising:

using at least two antennas for the reception and/or transmission of traffic in the user terminal from a higher node in the system;

receiving said traffic in one or more data streams with a rank of one or higher on a predefined channel;

choosing with which rank the higher node should transmit the traffic to the user terminal on said predefined channel, wherein the choice of rank is based on the following:

the estimated received data rate at the user terminal for different transmission ranks, wherein the user terminal is arranged to estimate the received data for different transmission ranks by monitoring the utilization/congestion of a downlink channel, and to use a degree of utilization above a certain threshold as an indication to choose a higher rank, the estimated power consumption in the user terminal for different transmission ranks, and the Signal to Noise ratio, (SNR) of the channel at the user terminal; and signaling this choice to the higher node in the system.

7. The method of claim 6, wherein the step of choosing comprises choosing a higher rank than a present rank on said predefined channel in response to determining that: (i) the estimated received data rate at the user terminal for the higher rank is higher than a first threshold, (ii) the ratio between the estimated power consumption in the user terminal for the present transmission rank and the total power used by the channel in the cell of the user terminal is below a second threshold, and (iii) the (SNR) of the channel used is above a third threshold.

8. The method of claim 6, wherein the utilization/congestion of a downlink channel is monitored by measuring the received power in resource blocks which are not destined for the user terminal.

9. The method of claim 6, wherein the method is applied in a UE for a 3G Long Term Evolution (a 3G LTE) MIMO system.

10. The method of claim 9, wherein said predefined channel is a Physical Downlink Shared Channel.

11. A user terminal for a wireless communications system, the user terminal comprising:

at least two antennas for the reception and/or transmission of traffic from a higher node in the system, the user terminal being arranged to receive said traffic in one or more data streams with a rank of one or higher, on a predefined channel;

a control unit arranged to choose with which rank the higher node should transmit the traffic to the user terminal on said predefined channel, and to also signal this choice to the higher node in the system, the control unit of the user terminal being arranged to base its choice of rank on the following:

the estimated received data rate at the user terminal for different transmission ranks, the estimated power consumption in the user terminal for different transmission ranks, and the Signal to Noise ratio (SNR) of the channel at the user terminal, and wherein the user terminal is arranged to choose a higher rank than a present rank if (i) the estimated received data rate at the user terminal for the higher rank is higher than a first threshold, (ii) the ratio between the estimated power consumption in the user terminal for the present transmission rank and the total power used by the channel in the cell of the user terminal is below a second threshold, and (iii) the SNR of the channel used is above a third threshold.

12. A method for a user terminal for a wireless communications system, the method comprising:

using at least two antennas for the reception and/or transmission of traffic in the user terminal from a higher node in the system;

receiving said traffic in one or more data streams with a rank of one or higher on a predefined channel;

choosing with which rank the higher node should transmit the traffic to the user terminal on said predefined channel, wherein the choice of rank is based on the following:

the estimated received data rate at the user terminal for different transmission ranks, the estimated power consumption in the user terminal for different transmission ranks, the Signal to Noise ratio (SNR) of the channel at the user terminal; and signaling this choice to the higher node in the system, and wherein the step of choosing comprises choosing a higher rank than a present rank on said predefined channel in response to determining that:

(i) the estimated received data rate at the user terminal for the higher rank is higher than a first threshold, (ii) the ratio between the estimated power consumption in the user terminal for the present transmission rank and the total power used by the channel in the cell of the user terminal is below a second threshold, and (iii) the SNR of the channel used is above a third threshold.

* * * * *

UNITED STATES PATENT AND TRADEMARK OFFICE
CERTIFICATE OF CORRECTION

| | | |
|---|---|---|
| PATENT NO. | : 8,923,198 B2 | Page 1 of 1 |
| APPLICATION NO. | : 13/512468 | |
| DATED | : December 30, 2014 | |
| INVENTOR(S) | : Gannholm et al. | |

It is certified that error appears in the above-identified patent and that said Letters Patent is hereby corrected as shown below:

In the Specification

In Column 1, Line 4, delete "APPLICATION(S):" and insert -- APPLICATION(S) --, therefor.

In Column 2, Line 58, delete "applied, and" and insert -- applied, --, therefor.

In Column 3, Line 60, delete "receive transmit" and insert -- receive/transmit --, therefor.

In Column 3, Line 64, delete "UE 215," and insert -- UE 200, --, therefor.

In Column 4, Line 34, delete "rank, AND" and insert -- rank, --, therefor.

In Column 4, Line 36, delete "acceptable," and insert -- acceptable, and --, therefor.

In Column 5, Line 24, delete "UE," and insert -- UE. --, therefor.

In Column 5, Line 30, delete "cell." and insert -- cell, --, therefor.

In the Claims

In Column 8, Line 22, in Claim 11, delete "if" and insert -- if: --, therefor.

Signed and Sealed this
Fourteenth Day of July, 2015

Michelle K. Lee
*Director of the United States Patent and Trademark Office*